Patented Mar. 1, 1949

2,462,981

UNITED STATES PATENT OFFICE 2,462,981

METHOD FOR THE PRODUCTION OF ITACONIC ACID

Lewis B. Lockwood and Andrew J. Moyer, Peoria, Ill., assignors to the United States of America as represented by the Secretary of Agriculture No Drawing. Application February 23, 1945, Serial No. 579,479

10 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a new and useful method for the production of itaconic acid by fermentation.

It is an object of this invention to produce itaconic acid by the fermentation of carbohydrate-containing mashes in better yields, in shorter fermentation times, and in a more practicable manner than heretofore. It is also an object of this invention to prevent the destruction of itaconic acid produced in fermentation mashes.

The production of itaconic acid by fermentation has been reported previously by Kinoshita (Acta Phytochimica 5 (3), 271–287 (1931)), and by Calam, Oxford, and Raistrick (Biochemical Journal 33, 1488–1495 (1939)). The procedures described by Kinoshita and by Calam et al. are not applicable to the commercial production of itaconic acid because of the low yields obtained and the long fermentation periods required. In addition, these procedures involved the cultivation of the molds on the surface of nutrient media, a method which is not economical of time, space, labor, and materials.

We have discovered a procedure by which better yields of itaconic acid are obtained and the fermentation time is markedly reduced. The method of our invention is applicable to the surface cultivation of filamentous itaconic acid-producing molds; the method of our invention also is applicable to the submerged cultivation of such molds, and when so applied results in the rapid and efficient production of itaconic acid. Production of itaconic acid by submerged mold culture has not been attained in the prior art.

We have found that superior yields of itaconic acid are obtained from carbohydrate-containing nutrient media subjected to the fermentative activities of filamentous itaconic acid-producing molds when measures are taken to control the pH prevailing in the media during the fermentation period.

Cultures of filamentous itaconic acid-producing molds of the genus aspergillus which are not subjected to pH control will usually exhibit a pH within the range 2.8 to 5.0. We have observed that in such mold cultures having a pH above 2.8, itaconic acid is to a very considerable extent decomposed by the mold or by the enzymes active in the fermentation medium. On the other hand, we have found that in mold cultures having a pH within the range 1.4 to 2.8, itaconic acid is not attacked appreciably by the mold or by the enzymes in the medium. The extent of attack of the itaconic acid is especially reduced in cultures having a pH within the range 1.4 to 2.4 which is preferred. By maintaining the pH of the nutrient medium within the range 1.4 to 2.8 during the time when the mold is producing itaconic acid we are able to diminish the destruction of the itaconic acid so produced with the result that there is a very considerable increase in the quantity of itaconic acid recovered at the end of the fermentation. Especially good results have been obtained by conducting the fermentation within the pH range 1.4 to 2.4.

To control the pH of the nutrient medium so that, during the fermentation, itaconic acid production occurs within the pH range 1.4 to 2.8, we add to the nutrient medium non-toxic mineral acids or ammonium salts of non-toxic mineral acids. A wide variety of mineral acids and the corresponding ammonium salts has been found suitable for this purpose; we obtain particularly good results with nitric acid, hydrochloric acid, sulfuric acid, and phosphoric acid, and the ammonium salts thereof.

The addition of mineral acid to the nutrient medium lowers the pH immediately because of the hydrogen ion supplied. On the other hand, the addition of an ammonium salt of a mineral acid to the nutrient medium, or the incorporation of such a salt in the nutrient medium results in a gradual but nevertheless effective, acidification of the nutrient medium owing to the fact that the ammonium ion is preferentially assimilated by the itaconic acid-producing mold, leaving in the medium residual ions of the respective non-toxic mineral acids.

When the free mineral acids are used as a means of pH control, they may be added to the nutrient medium in concentrated form or they may be diluted with water prior to use. Quantities of these acids sufficient to bring about the desired reduction in pH may be added at the beginning of the fermentation, or, preferably, may be added after the mold has established its growth. The precise time when it is most desirable to make the acid addition is somewhat dependent on the type of inoculum employed. If the medium is inoculated with spores of the itaconic acid-producing mold, it will generally be desirable to allow the spores to germinate and to permit some slight mycelial growth to occur before adding the mineral acid. Addition of the mineral acid before the spores have germinated usually will retard germination and growth, but will be effective in eventually leading to the obtaining of high yields of itaconic acid, since the spores will ultimately germinate, growth will become established, and the fermentation will proceed. Accordingly, the invention contemplates the addition of mineral acid to the culture medium either at the beginning of the fermentation or after spore germination and growth have occurred. If the mineral acid is added after spore germination and growth have occurred, it is usually desirable to add the acid soon after these stages of the mold development are manifested, so as to reduce the pH of the medium to within the range 1.4 to 2.8 before much of the sugar is metabolized by the mold, and before much itaconic acid is formed and exposed at the higher pH levels to the destructive action of the mold or enzymes.

If the fermentation medium is inoculated with vegetative growth of the mold, it is usually desirable to add the mineral acid immediately so as to reduce the pH at once to within the range 1.4 to 2.8. This prompt increase in acidity is desirable because the vegetative growth is capable of initiating the conversion of carbohydrate to itaconic acid almost immediately upon contact with the medium, and production of itaconic acid in media of high pH is to be avoided, as explained above.

Sometimes one adjustment of the pH of the culture medium to within the range 1.4 to 2.8 is sufficient to maintain the pH within this range throughout the entire fermentation period. At other times, however, it has been found necessary to make two or more additions of acid to maintain the pH within the stipulated range. Particularly in submerged mold cultures a tendency toward pH increase during the fermentation period has been noted, necessitating multiple additions of acid. Such multiple additions may be made at intervals of several hours, or at daily intervals, or may be brought about at more frequent intervals by means of automatic pH control instruments.

When ammonium salts of non-toxic mineral acids are employed as means of pH control, they may be added during the course of the fermentation, or, preferably, they may be incorporated in the medium prior to its sterilization. We have found that these salts are effective when used in quantity corresponding to 0.01 to 0.30 gram-equivalent of salt per liter of nutrient medium. Particularly good results are obtained with quantities corresponding to 0.03 to 0.10 gram-equivalent of salt per liter of medium.

We have found that itaconic acid is produced in good yields and in short fermentation times by cultivating the itaconic acid-producing molds in the submerged condition in media subjected to pH control by the use of non-toxic mineral acids or ammonium salts thereof. In the submerged mold cultures, the itaconic acid-producing mold is caused to grow submerged in the medium by agitation and aeration of the mass comprising the mold substance and the nutrient medium. Agitation may be effected by means common to the art, such as mechanically-driven propellers or agitators, or may be effected by the bubbling of oxygen-containing gases through the mass. Aeration may be effected by bubbling oxygen-containing gases through the mass or by agitating the mass in the presence of such gases. The mass may be agitated and aerated at atmospheric pressure or at superatmospheric pressure. Air may be employed as the oxygen-containing gas, or mixtures of oxygen with other gases, such as carbon dioxide, nitrogen, air and the like, may be used.

Carbohydrate materials suitable for incorporation into nutrient media for the production of itaconic acid according to the method of the invention include glucose, sucrose, maltose, dextrins, molasses, acid-hydrolyzed starch, and enzyme-hydrolyzed starch.

Good yields of itaconic acid have been obtained from numerous strains of Aspergillus terreus, when the fermentation mash is subjected to pH control according to the method of the invention. Approximately 500 different strains of Aspergillus terreus have been tested, and the vast majority of these strains give good itaconic acid yields when cultivated according to the method of the invention. Two strains which have shown exceptionally good productivity are Aspergillus terreus NRRL 265 and Aspergillus terreus NRRL 1960, which are available from the culture collection of the Northern Regional Research Laboratory, Peoria, Illinois. Itaconic acid production by Aspergillus itaconicus has also been accomplished, using the method of our invention. However, this species does not sporulate as readily as Aspergillus terreus, and it is therefore more difficult to secure seed. Furthermore, the yields of itaconic acid produced by Aspergillus itaconicus are usually not as high as those obtained using Aspergillus terreus.

This invention contemplates the production of itaconic acid from nutrient media supplemented with non-toxic mineral acids either alone or in combination with ammonium salts of such acids. The invention also contemplates the production of itaconic acid from nutrient media supplemented with ammonium salts of non-toxic mineral acids, either alone or in combination with non-toxic mineral acids.

As an illustrative embodiment of a manner in which our invention may be practiced, the following examples are given:

*Example I*

A medium of the following composition was prepared:

| | |
|---|---|
| Glucose _____grams__ | 220 |
| $MgSO_4 \cdot 7H_2O$ _____do____ | 0.250 |
| $KH_2PO_4$ _____do____ | 0.300 |
| $KNO_3$ _____do____ | 0.500 |
| $NH_4NO_3$ _____do____ | 0.500 |
| Corn steep liquor (30° Baumé) milliliters__ | 1.0 |

Water to make 1000 ml.

Fifty ml. portions of this medium were placed in 200 ml. Erlenmeyer flasks, sterilized by steaming, and then cooled. Some of the flasks were inoculated with Aspergillus terreus NRRL 164-5238 and incubated at 30° C.; the original pH of the medium in these flasks was 4.2. Other flasks were inoculated with the same organism and the medium was adjusted to pH 1.7 by the addition of 1.5 ml. of 0.5 N hydrochloric acid prior to incubation at 30° C. After 18 days incubation, during which time the mold grew as a surface pellicle, analyses showed that each of the cultures which had been treated with hydrochloric acid contained 7.4 milli-equivalents of itaconic acid, whereas each of the untreated cultures contained only 2.2 milli-equivalents of itaconic acid.

*Example II*

A medium of the following composition was prepared:

| | | |
|---|---|---|
| Sucrose | grams | 150 |
| MgSO$_4$·7H$_2$O | do | 4.4 |
| NH$_4$NO$_3$ | do | [1] 2.5 |
| NaCl | do | 0.4 |
| ZnSO$_4$·7H$_2$O | do | 0.0044 |
| Concentrated corn steep liquor (30° Baumé) | milliliters | 4.0 |

Water to make 1000 ml.

[1] 0.031 gram-equivalent.

Twelve liters of this medium (which had a pH of 4.2) was steam sterilized, placed in a sterile aluminum fermentation tray, and inoculated with a spore suspension of *Aspergillus terreus* NRRL 265. The depth of the medium in this tray was approximately 1.5 inches. The tray culture was incubated at 30° C. in a cabinet arranged to permit the circulation of sterile humidified air. After 24 hours, surface mycelial growth was apparent, and a sample of the medium withdrawn from beneath the mycelium showed a pH of 4.0. Concentrated nitric acid diluted with an equal volume of water was added to the medium at this time, with gentle stirring, to reduce the pH of 2.0, a total of 19.2 ml. of concentrated acid being required. Upon incubating for an additional eleven days, the pH remained between 2.0 and 2.3, and the sugar was completely fermented. Analysis for itaconic acid by bromination showed a yield of 585 grams, equivalent to 32.5 percent of the weight of sugar supplied. The itaconic acid was recovered by evaporation and crystallization.

*Example III*

A medium of the following composition was prepared:

| | | |
|---|---|---|
| Glucose | grams | 100 |
| MgSO$_4$·7H$_2$O | do | 4.5 |
| NaCl | do | 0.2 |
| (NH$_4$)$_2$SO$_4$ | do | [1] 2.05 |
| ZnSO$_4$·7H$_2$O | do | 0.0044 |
| Concentrated corn steep liquor (30° Baumé) | milliliters | 4 |
| HNO$_3$ (Sp. Gr. 1.42) | do | 1.60 |

Water to make 1000 ml.

[1] 0.031 gram-equivalent.

This medium had a pH of 1.6. It was placed in a 4-liter Pyrex bottle equipped with an air sparger and propeller for the purposes of aeration and agitation. After steam sterilization and cooling, the medium was inoculated with 50 ml. of a vegetative growth of *Aspergillus terreus* NRRL 1960. Aeration with sterile air at the rate of 400 ml. per minute was conducted continuously, and the propeller was revolved constantly to keep the mold growth submerged and in suspension. Samples were withdrawn at 24-hour intervals to determine pH and sugar content. To maintain the pH below 2.4, it was necessary to add 2 ml. of concentrated nitric acid on the third and fifth days and 1 ml. of concentrated nitric acid on the seventh day. By the eighth day the sugar had been consumed and analysis of the liquors showed that 21 grams of itaconic acid had been produced.

*Example IV*

A medium of the following composition was prepared:

| | | |
|---|---|---|
| Glucose | grams | 165 |
| MgSO$_4$·7H$_2$O | do | 0.250 |
| KH$_2$PO$_4$ | do | 0.300 |
| ZnSO$_4$·7H$_2$O | do | 0.022 |
| NH$_4$NO$_3$ | do | [1] 1.50 |
| Corn steep liquor (30° Baumé) | milliliters | 1.0 |

Water to make 1000 ml.

[1] 0.0188 gram-equivalent.

Fifty ml. portions of this medium were distributed in 200 ml. flasks, sterilized, inoculated with *Aspergillus terreus* 164-5474 F11, and incubated at 30° C. After 12 days, 18.6 milli-equivalents of itaconic acid were found to have been formed in each flask. The initial pH of the medium was 4.2 and the final pH was 2.7.

*Example V*

A medium of the following composition was prepared:

| | | |
|---|---|---|
| Glucose | grams | 104 |
| MgSO$_4$·7H$_2$O | do | 4.5 |
| NaCl | do | 0.2 |
| NH$_4$NO$_3$ | do | [1] 2.5 |
| ZnSO$_4$·7H$_2$O | do | 0.0044 |
| Corn steep liquor (30° Baumé) | milliliters | 4.0 |
| 0.5 Normal HNO$_3$ | do | 50 |

Water to make 1000 ml.

[1] 0.031 gram-equivalent.

750 ml. of this medium (pH 1.95) was placed in a 3000 ml. Fernbach culture flask, sterilized by steaming, cooled, and inoculated with spores of *Aspergillus terreus* NRRL 1960. The flask and contents were placed on an eccentric shaking machine which imparted a swirling motion to the liquid mass, resulting in a vortex in the center of the liquid. The flask was agitated in this manner throughout the entire fermentation period, and the mold grew in the submerged condition. Adjustment of the pH of the medium to 2.0 was made daily by addition of concentrated nitric acid. On the eighth day of fermentation, analysis showed the presence of 16.2 grams of itaconic acid.

Having thus described our invention, what we claim for Letters Patent is:

1. A process of producing itaconic acid comprising fermenting a carbohydrate-containing nutrient medium with molds of the genus Aspergillus, and adding to the medium a member selected from the group consisting of non-toxic mineral acids and ammonium salts of non-toxic mineral acids in an amount sufficient to maintain the medium during fermentation within the range pH 1.4 to 2.4.

2. The process of claim 1 wherein the member added to the medium is nitric acid.

3. The process of claim 1 wherein the member added to the medium is hydrochloric acid.

4. The process of claim 1 wherein the member added to the medium is sulfuric acid.

5. The process of claim 1 wherein the member added to the medium is ammonium nitrate.

6. The process of claim 1 wherein the member added to the medium is ammonium chloride.

7. The process of claim 1 wherein the member added to the medium is ammonium sulfate.

8. The process of claim 1 wherein the fermentation mass is agitated in the presence of an oxygen containing gas.

9. The process of claim 8 wherein the oxygen containing gas is air.

10. The process of claim 8 wherein the mold is *Aspergillus terreus*, and the fermentation mass is maintained under superatmospheric pressure.

LEWIS B. LOCKWOOD.
ANDREW J. MOYER.

REFERENCES CITED

The following references are of record in the file of this patent:

UNITED STATES PATENTS

| Number | Name | Date |
|---|---|---|
| 2,385,283 | Kane et al. | Sept. 18, 1945 |

OTHER REFERENCES

Levine et al., Compilation of Culture Media, Williams & Wilkins, 1930, pp. 12, 14, 27, 64, 68, and 78.

Calam et al., Biochem. Jour. 33, 1939, "Itaconic Acid, a Metabolic Product of a Strain of *Aspergillus terreus* Thom."

Smith, Industrial Mycoloyg, 2 ed., London, Edw. Arnold & Co., Ltd. (1942), page 166.

Starkey et al., Jr. Bact. 45 (1943), pp. 512 and 13.